S. BROWN.
WHEEL.
APPLICATION FILED DEC. 12, 1910.
1,072,305.
Patented Sept. 2, 1913.
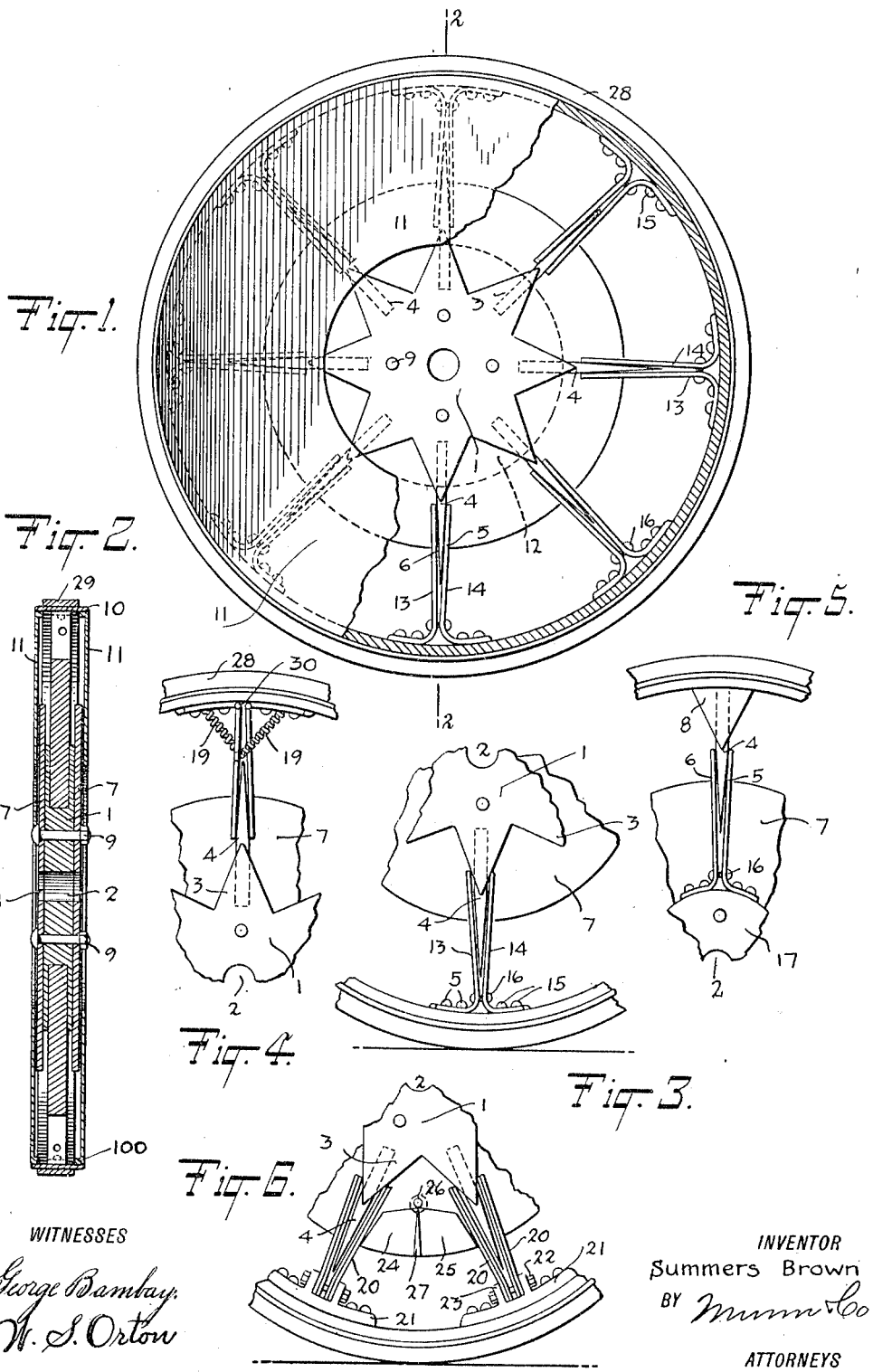
WITNESSES
George Bambay.
W. S. Orton
INVENTOR
Summers Brown
BY Munn & Co
ATTORNEYS

UNITED STATES PATENT OFFICE.

SUMMERS BROWN, OF LONDON, ENGLAND.

WHEEL.

1,072,305.  Specification of Letters Patent.  Patented Sept. 2, 1913.

Application filed December 12, 1910. Serial No. 596,821.

*To all whom it may concern:*

Be it known that I, SUMMERS BROWN, a subject of the King of England, and a resident of London, England, have invented a new and Improved Wheel, of which the following is a full, clear, and exact description.

My invention relates to a new and improved resilient spring wheel.

An object of my invention is to provide a wheel for use on vehicles, whereby I may attain all the advantages of a pneumatic or cushion type wheel without the disadvantages thereof.

A further object of my invention is to provide a wheel for absorbing shocks from uneven roads, or obstructions on the same.

A further object of my invention is to provide means whereby the wheel is stiffened and reinforced, and whereby dust is excluded from the movable parts.

A further object of my invention is to provide a wheel comprising relatively few parts which might get out of order, to provide means whereby access may readily be gained to the different parts, and in which the different parts may readily be replaced.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a side elevation of a preferred embodiment of my invention, parts being broken away to show the internal mechanism; Fig. 2 is a transverse sectional view taken on the line 2—2 of Fig. 1; Fig. 3 is a detailed elevation partly broken away, showing one means of attachment between the hub and the outer rim; Fig. 4 is a detailed elevation showing another means for obtaining this connection; Fig. 5 is a view similar to Fig. 3, but showing the arrangement of the springs reversed; and Fig. 6 is a modified form of the device shown in Fig. 3, showing reinforcing plates for the spring members.

In the drawings, I have shown a member 1 forming the hub of my wheel, bored at 2 to accommodate any preferred form of axle. The member 1 is star-shaped in elevation having a series of double inclined teeth 3 disposed radially out from the axis. This star-shaped member is recessed in from each of the points of the star, as shown in dotted lines in Fig. 1, into which recesses are positioned wedge members 4 extending outwardly a considerable distance beyond the outer periphery of the star-shaped member. These wedge members have opposed surfaces 5 and 6 converging outwardly to form a wedge.

Concentric with the axis of the wheel and disposed on opposite sides of the member 1, are circular plates 7, the diameter of each of which is slightly less than the diameter of the member 1 and their attached wedge members 4, thereby reinforcing the star-shaped member 1. The members 7 are apertured at 8 in alinement with the aperture or bore 2, and these plates 7 are held in engagement with the member 1 by means of a bolted connection 9.

Disposed concentrically about the inner member 1, is an outer rim 10, normally disposed in the same plane with the inner member 1 and spaced therefrom. This outer rim 10 is screw threaded upon the inner side and adjacent each outer edge, engaging each of which threaded portions is the threaded flange 100 of a pair of spaced apart inwardly-projecting circular side plates 11, embracing between them the plates 7 and having a centrally-disposed enlarged recess 12, concentric with the axle, thereby allowing the inner member and the axle of the wheel free play. Positioned upon the inner edge of the outer rim 10, is a series of pairs of opposed L-shaped leaf springs 13 and 14, each spring having one leg of the L permanently affixed to the inner rim by connections 15, and the two springs or yielding plates 13 and 14 may be further reinforced and held in position by means of a bolt connection 16 passing through each plate. These plates extend inwardly toward the axis of the wheel in the radius thereof and embrace between them the opposed surfaces 5 and 6 of the wedge members 4. Instead of placing the spring members on the outer rim, I may reverse this construction, as shown in Fig. 5, and place them upon a cylindrical member 17 corresponding to the star-shaped member 1 and having the wedge members projecting inwardly from the outer rim. In this case, the wedge members 4 may be braced in position by means of a triangular-shaped brace plate 8 positioned on each side of the wedge member 4 and extending inwardly from the outer rim. Instead of depending upon the resiliency of these L-shaped hinge members, I may insert a hinge connection between the two legs of the L, as shown at 30 in Fig. 4, and hold the two members together by means of the coil springs 19 attached to the long arm of the L-shaped member crossing each other and extending diagonally outwardly and having their outer ends attached to the outer rim of the wheel. Where this wheel is used on wagons carrying very heavy loads, it has been found advisable to reinforce these spring plates 13 and 14 by stacking two or more additional plates 20, as best shown in Fig. 6, backed against the plates 13 and 14, and in this connection to hold them in position by means of a curved bracket 21 positioned upon the inner rim, and to hold all of the plates in position by means of a bolted connection 22 passing through lugs 23 extending inwardly from the bracket 21.

In order to prevent dust from filtering in to the springs, I have provided quadrilateral hinge blocks 24, 25, as shown in Fig. 6, hinged together at one of their angles as shown at 26 to the side plates 7, and so shaped that their outer edges will always be in contact with the adjacent spring plates, irrespective of the relative location of the outer rim or hub. These blocks are kept separated by means of a spring 27.

It is to be understood that I may place any form of tire about my device, making use of a rubber tire as shown at 28 in Figs. 1 and 4, or by use of a flat rim tire 29 of iron or any other suitable material, as shown in Fig. 2.

As many changes could be made in the above construction and many apparently widely different embodiments of this invention could be made without departing from the scope thereof, it is intended that all matters contained herein in the above description or shown in the accompanying drawings shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween, and that materials, sizes and relativities of parts are non-essential, except as called for in the claims.

Having thus described my invention, I claim as new and desire to secure by Letters Patent:

1. In a resilient wheel, a star-shaped member, wedge members projecting from the points of said star-shaped member, an outer rim concentric with said star-shaped member, pairs of springs upon said outer rim engaging said wedge members, means adapted to retain said springs in engagement, and side plates extending from said outer rim telescoping said star-shaped member, thereby reinforcing the connection between said springs and said wedge members.

2. In a wheel, an inner member, an outer member in telescopic engagement with said inner member, resilient means between said members, hinged blocks arranged in pairs, between adjacent resilient means, and a spring between the blocks to hold the same in contact with said resilient means to prevent the access of dust thereto.

3. A wheel comprising a star-shaped member recessed at each of the points, a wedge member projecting from each recess, an outer rim concentrically disposed relative to said star member, and a series of pairs of inwardly-extending leaf springs spaced about the outer rim and containing between the members of each pair, one of the wedge members.

4. A wheel comprising a star-shaped member recessed at each of the points, a wedge member projecting from each recess, an outer rim concentrically disposed relative to said star member, a series of pairs of inwardly-extending leaf springs spaced about the outer rim and containing between the members of each pair, one of the wedge members, and plates disposed on opposite sides of said star member, adapted to hold the parts in place.

5. In a resilient wheel, a hub member, an outer rim, resilient connections between said hub and rim, and blocks hinged between said resilient members to prevent the infiltration of dust to the wheel.

6. In a spring wheel an inner rim, an outer rim, a series of pairs of leaf springs, each pair of said springs being fastened together at one end and secured at said end to one of said rins and projecting toward the other rim, the other rim being provided with a series of triangular shaped projecting members, wedge members projecting from the said triangular shaped members, one of said wedge members extending between the members of each pair of leaf springs at the opposite ends of said springs, and means for retaining the springs and wedges in engagement with each other.

7. In a resilient wheel, an inner hub member, an outer or rim member concentric with the hub member, a series of pairs of springs on one of said members, co-acting wedges carried by the other member, one of said wedges extending between the members of each pair of springs, circular side plates secured to the inner or hub member, side plates extending from the outer or rim member and embracing between them, the first mentioned side plates, hinged members hinged to the circular side plates secured to the inner or hub member, the said hinged members being arranged between adjacent pairs of said springs, and means for holding the outer edges of said members in contact with said springs.

In testimony whereof I have signed my name to this specification in the presence of two subscribing witnesses.

SUMMERS BROWN.

Witnesses:
W. S. ORTON,
PHILIP D. ROLLHAUS.

Copies of this patent may be obtained for five cents each, by addressing the "Commissioner of Patents, Washington, D. C."